V. E. RANDALL.
CLOSURE FOR CANS AND CONDUIT BUSHINGS.
APPLICATION FILED NOV. 18, 1919.
1,348,317.
Patented Aug. 3, 1920.
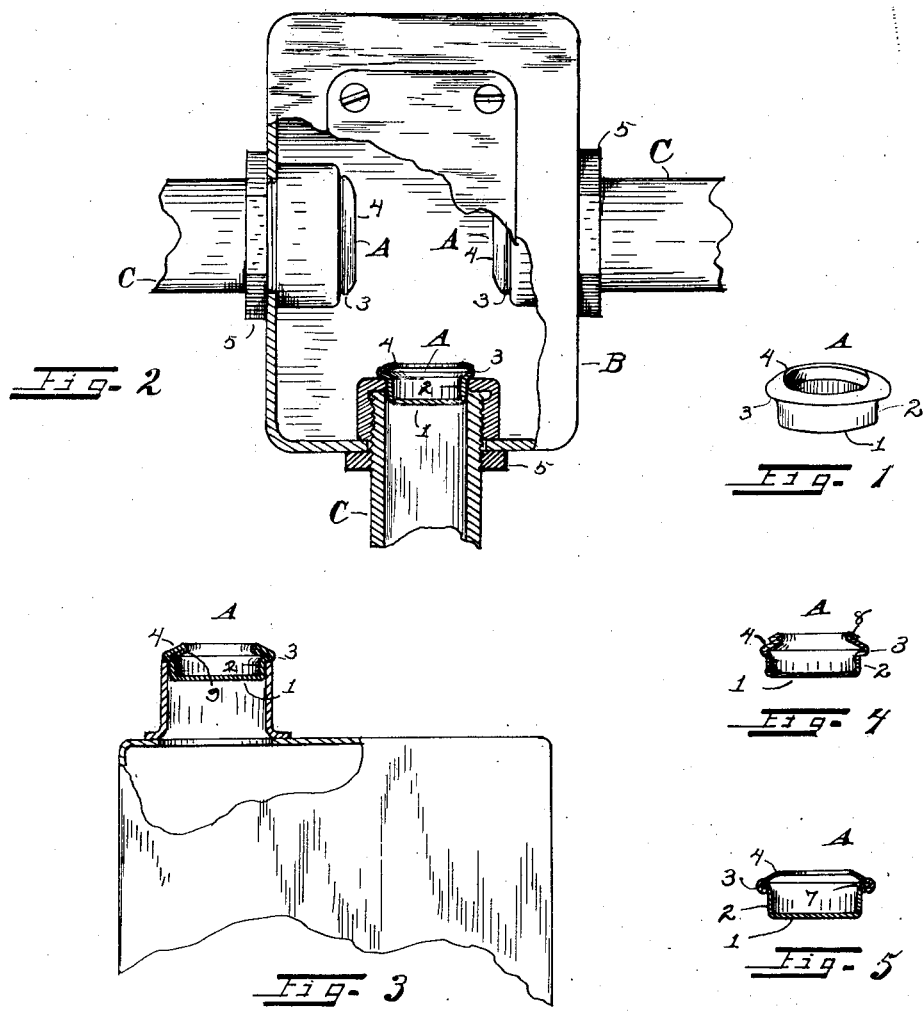

UNITED STATES PATENT OFFICE.

VICTOR E. RANDALL, OF BATTLE CREEK, MICHIGAN.

CLOSURE FOR CANS AND CONDUIT-BUSHINGS.

1,348,317. Specification of Letters Patent. Patented Aug. 3, 1920.

Application filed November 18, 1919. Serial No. 338,988.

*To all whom it may concern:*

Be it known that I, VICTOR E. RANDALL, a citizen of the United States, residing at Battle Creek, in the county of Calhoun and State of Michigan, have invented certain new and useful Improvements in Closures for Cans and Conduit-Bushings, of which the following is a specification, the principle of the invention being therein shown to enable those skilled in the art to which it appertains to make and use the same.

The present invention relates to closures for cans, conduit bushings and other articles having cover openings.

A characteristic feature of the present invention is the formation in a cover or closure of sheet metal in which the rim or top opening of the same overhangs its dished bottom portion, a rib or annular flange being burred or turned outwardly at the junction of said body and rim and forming a stop for limiting said closure within the neck or opening of a can, bushing or other aperture.

An important object of the invention is to provide a cover having an outwardly-flaring rib or flange from which an inwardly-disposed rim projects to overhang the closed bottom of said cover whereby a nail, screw or other device may be introduced within the top of said cover to engage said rim and dislodge said cover from its anchorage.

In the drawings forming part of this specification, Figure 1 is a perspective view of an embodiment of my invention.

Fig. 2 is a side elevation in broken section of an outlet or junction box into which electrical conduits are fitted, the bushings of which are fitted with my improved closures.

Fig. 3 is a broken side elevation of a can or container with an embodiment of my improved closure fitted in its nozzle.

Fig. 4 is another embodiment of my improved closure, the rim of which is burred or turned outwardly upon itself, the view being a vertical cross section.

Fig. 5 is another embodiment of my improved closure in vertical cross section, the closure being formed of two sectional parts.

In the drawings, like marks of reference refer to equivalent parts in the different views in which A, represents a dished closure formed of thin sheet metal, the same having a bottom 1 with an upwardly-disposed vertical wall 2.

As shown in Figs. 1 and 2, the wall 2 is burred or turned outwardly at its top and forms a flange 3 providing a stop for limiting the cover from being pressed wholly within an aperture, neck, nozzle or other opening within which it may be fitted. The flange 3 is curved or turned inwardly and forms a rim 4 disposed to overhang the bottom of the cover, the opening in the rim affording a convenient means into which a hook, screw or other device may be inserted to lift the cover from its seat when lodged in an opening.

In Fig. 2, B is an ordinary conduit or junction box through the side walls of which the tubular conduits C for electrical wiring are fitted, the conduits having jam nuts 5 screw-threaded and bearing against the box exterior, and having ring bushings screw-threaded on their free ends within said box, the openings of the bushings and conduits being fitted with the closures A to preclude debris from getting thereinto.

A closure of the character set forth is especially valuable when employed with electrical wiring conduits, from the fact that the junction boxes usually have small exterior openings through which the wiring emerges to engage lamp sockets, switches, etc., and much difficulty is experienced in removing closures owing to the meager accessibility afforded, whereas with a cover having an open top, a buttonhook, nail or other instrument may be easily inserted and the cover lifted from its seat.

In Fig. 5, the closure A is represented as formed of two parts. In this instance the side wall 2 of the closure has an outwardly-flaring rim 7 upon and over which the top indrawn rim 4 is burred or turned inwardly, locking the parts intact. It would be evident that a reversal of the method could be employed, and that the rim 4 could be outwardly flared to receive the burred top edge of the side wall 2 for a like purpose.

In Fig. 4 the rim 4 is burred and turned upon itself and forms an overlying hem 8, and in Fig. 3 the rim 4 is turned under and against itself and forms an inner hem 9, the object in both instances being to reinforce the rim so that the liability of bending will be minimized when removing covers from tightly sealed cans, such as are used for shellac, varnish, glue, and resinous or other adhesive mixtures.

From the foregoing description, taken in connection with the accompanying drawings, a more extended explanation of the uses, objects and advantages of my invention is believed to be unnecessary.

Having, therefore, set forth my invention, what I claim as new and desire to secure by Letters Patent, is:—

1. In a device of the class set forth, the combination with the nozzle of a container, of a cover comprising a dished bottom, the side walls of which impinge the inner wall of said container nozzle and formed with outwardly-rounded rims seating on said nozzle and having its edge terminating inwardly to overhang said dished bottom.

2. In a device of the class set forth, the combination with the nozzle or neck of a container, of a cover comprising a dished bottom the side walls of which impinge the inner surface of said nozzle or neck, and formed with an outwardly burred rim seated on said nozzle or neck and having its edge turned inwardly and upwardly to overhang said dished bottom.

3. In a device of the class set forth, the combination with the neck opening of a receptacle, of a cover having a dished bottom the side walls of which impinge the inner wall of said neck opening, and formed with an outwardly burred rim seating on said neck opening and having a portion turned inwardly, thence turned backwardly, the inner edge of which overhangs said dished bottom.

4. In a device of the class set forth, the combination with the neck or opening of a can or other receptacle, a cover having a dished bottom the side walls of which impinge the inner side wall of said neck or opening, and having an outwardly-flaring rim seating on the neck or opening of a can or other receptacle and formed with a rebent inwardly-turned extension overhanging said dished bottom, substantially as set forth and for the purpose described.

VICTOR E. RANDALL.

Witnesses:
  HOWARD H. BALDORFF,
  F. H. WINGATE.